US011704499B2

(12) United States Patent
Agrawal et al.

(10) Patent No.: US 11,704,499 B2
(45) Date of Patent: Jul. 18, 2023

(54) GENERATING QUESTIONS USING A RESOURCE-EFFICIENT NEURAL NETWORK

(71) Applicant: Microsoft Technology Licensing, LLC, Redmond, WA (US)

(72) Inventors: Shubham Agrawal, Bellevue, WA (US); Owais Khan Mohammed, Bellevue, WA (US); Weiming Wen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 281 days.

(21) Appl. No.: 17/228,728

(22) Filed: Apr. 13, 2021

(65) Prior Publication Data
US 2022/0327287 A1 Oct. 13, 2022

(51) Int. Cl.
*G06F 40/30* (2020.01)
*G06F 16/93* (2019.01)
*G06F 40/126* (2020.01)
*G06F 40/284* (2020.01)
*G06N 3/08* (2023.01)
*G06N 3/045* (2023.01)

(52) U.S. Cl.
CPC .............. *G06F 40/30* (2020.01); *G06F 16/93* (2019.01); *G06F 40/126* (2020.01); *G06F 40/284* (2020.01); *G06N 3/045* (2023.01); *G06N 3/08* (2013.01)

(58) Field of Classification Search
CPC ........ G06F 40/30; G06F 16/93; G06F 40/126; G06F 40/284; G06N 3/045; G06N 3/08
See application file for complete search history.

(56) References Cited

U.S. PATENT DOCUMENTS

| | | | |
|---|---|---|---|
| 2018/0114108 A1 | 4/2018 | Lao et al. | |
| 2019/0043379 A1* | 2/2019 | Yuan | G09B 7/02 |

(Continued)

OTHER PUBLICATIONS

Otter, et al., "A Survey of the Usages of Deep Learning for Natural Language Processing," in IEEE Transactions on Neural Networks and Learning Systems, vol. 32, No. 2, Feb. 2021, pp. 604-624.

(Continued)

*Primary Examiner* — Bhavesh M Mehta
*Assistant Examiner* — Darioush Agahi

(57) ABSTRACT

Technology is described herein for generating questions using a neural network. The technology generates the questions in a three-step process. In the first step, the technology selects, using a first neural network, a subset of textual passages from an identified electronic document. In the second step, the technology generates, using a second neural network, one or more candidate answers for each textual passage selected by the first neural network, to produce a plurality of candidate passage-answer pairs. In the third step, the technology selects, using a third neural network, a subset of the plurality of candidate passage-answer pairs. The technology then generates an output result that includes one or more output questions chosen from the candidate passage-answer pairs produced by the third neural network. The use of the first neural network reduces the processing burden placed on the second and third neural networks. It also reduces latency.

20 Claims, 12 Drawing Sheets

(56) References Cited

U.S. PATENT DOCUMENTS

2019/0228099 A1     7/2019   Bajaj et al.
2020/0183963 A1     6/2020   Ghaeini et al.

OTHER PUBLICATIONS

Arras, et al., "'What is relevant in a text document?': An interpretable machine learning approach," in PLoS ONE, 12 (8), Aug. 11, 2017, 23 pages.

PCT Search and Written Opinion for PCT/US2022/021245, dated Jul. 12, 2022, 19 pages.

Alammar, Jay, "The Illustrated Transformer," available at http://jalammar.github.io/illustrated-transformer/, Github, Jun. 27, 2018, 23 pages.

Alammar, Jay, "The Illustrated GPT-2 (Visualizing Transformer Language Models)," available at https://jalammar.github.io/illustrated-gpt2/, Github, Aug. 12, 2019, 43 pages.

Radford, et al., "Language Models are Unsupervised Multitask Learners," available at https://openai.com/blog/better-language-models/in, in OpenAI blog, Feb. 2019, 24 pages.

Vaswani, et al., "Attention is All you Need," in Advances in Neural Information Processing Systems 30 (NIPS 2017), 2017, 11 pages.

"Beam search," available at https://en.wikipedia.org/wiki/Beam_search, Wikipedia article, accessed on Feb. 27, 2021, 3 pages.

Khandelwal, Renu, "An intuitive explanation of Beam Search," available at https://towardsdatascience.com/an-intuitive-explanation-of-beam-search-9b1d744e7a0f, in Medium: Towards Data Science, Feb. 1, 2020, 9 pages.

Wolf, et al., "Transformers: State-of-the-Art Natural Language Processing," in Proceedings of the 2020 Conference on Empirical Methods in Natural Language Processing: System Demonstrations, Oct. 2020, pp. 38-45.

Devlin, et al., "BERT: Pre-training of Deep Bidirectional Transformers for Language Understanding," arXiv:1810.04805v2 [cs.CL], May 24, 2019, 16 pages.

Horev, Rani, "BERT Explained: State of the art language model for NLP," available at https://towardsdatascience.com/bert-explained-state-of-the-art-language-model-for-nlp-f8b21a9b6270, in Medium: Towards Data Science, Nov. 10, 2018, 8 pages.

Kaptein, Maurits, "Creating ONNX from scratch," available at https://towardsdatascience.com/creating-onnx-from-scratch-4063eab80fcd, in Medium: Towards Data Science, Feb. 5, 2021, 17 pages.

\* cited by examiner

ONE APPLICATION OF THE QUESTION-GENERATING SYSTEM 1202

RECEIVE AN INSTRUCTION FROM A USER TO ACTIVATE A SEARCH SYSTEM, THE SEARCH SYSTEM BEING CONFIGURED TO EXECUTE A SEARCH WITHIN AN ELECTRONIC DOCUMENT.
1204

GENERATE A CONTROL ELEMENT IN RESPONSE TO THE INSTRUCTION THAT ENABLES THE USER TO INTERACT WITH A SEARCH SYSTEM VIA A USER INTERFACE.
1206

INVOKE THE QUESTION-GENERATING SYSTEM, WHICH PRODUCES ONE OR MORE OUTPUT QUESTIONS, THE OUTPUT QUESTIONS BEING FORMULATED FOR PRESENTATION BY THE CONTROL ELEMENT.
1208

FIG. 12

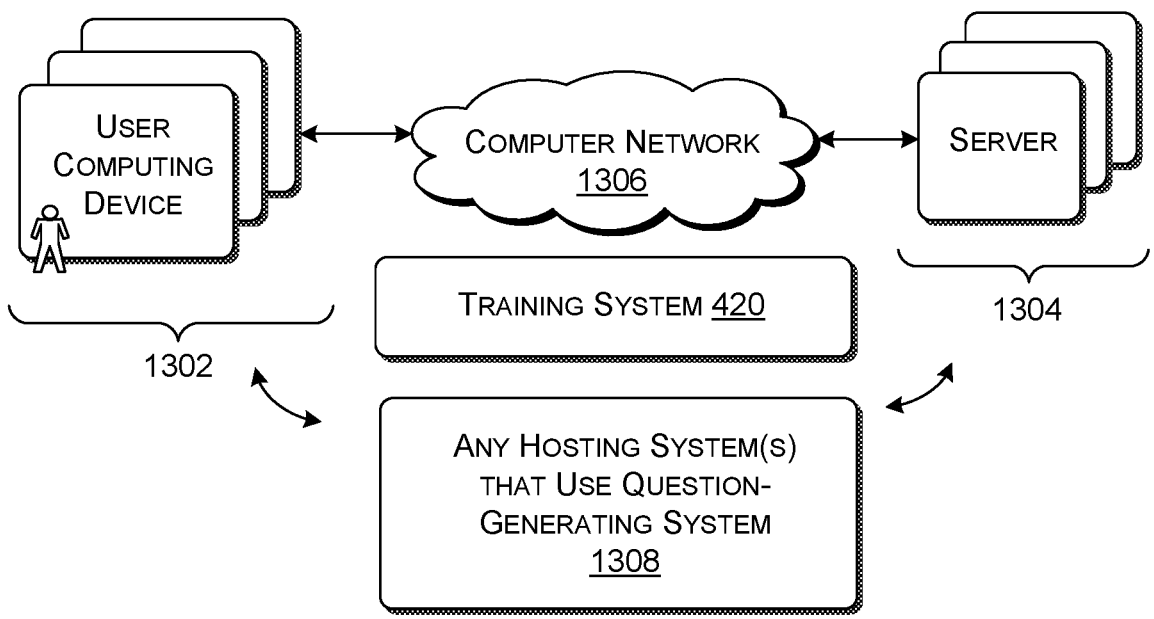

FIG. 13

GENERATING QUESTIONS USING A RESOURCE-EFFICIENT NEURAL NETWORK

BACKGROUND

Many computer applications make use of natural language processing (NLP) models. While these models may improve the quality of an application's output results, their use may also impose performance-related costs. For instance, an NLP model may consume a significant amount of system resources (e.g., processor resources, memory resources, etc.). The use of the NLP model may also increase the amount of time it takes for the application to produce its output results. In some cases, these factors may make an application that uses an NLP model unsuitable for implementation on resource-constrained computing platforms, such as those used by some kinds of handheld computing devices.

SUMMARY

Computing technology is described herein for generating questions using a neural network. The technology generates the questions in a three-step process. In the first step, the technology selects, using a first neural network, a subset of textual passages from an identified electronic document ("document" henceforth). In the second step, the technology generates, using a second neural network, one or more candidate answers for each textual passage selected by the first neural network, to produce a plurality of candidate passage-answer pairs. In the third step, the technology selects, using a third neural network, a subset of the plurality of candidate passage-answer pairs produced by the second neural network. The technology then generates an output result that includes one or more output questions chosen from the plurality of candidate passage-answer pairs produced by the third neural network.

According to one technical merit, the first neural network reduces the number of passages to be processed by the second neural network and the third neural network. This behavior has the effect of reducing the amount of system resources that are needed to produce the output questions. It also reduces the amount of time that that the technology requires to generate the output questions.

According to one illustrative aspect, the technology performs the above-described three-step process when the user invokes a search system in the course of interacting with a document. The technology can present the output questions via a control element provided by the search system.

According to another illustrative aspect, the technology randomly selects a query embedding produced by a distribution of query embeddings. The distribution of query embeddings, in turn, is produced in a prior training process. The first neural network generates attention information based on a consideration of a relation between the chosen query embedding and each passage in the electronic document.

According to another illustrative aspect, the training process produces each query embedding in the distribution of query embeddings by down-sampling an original query to produce a down-sampled query, and then up-sampling the down-sampled query.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 12 is a flowchart that describes one application of the question-generating system of FIG. 1.

FIG. 13 shows computing equipment that can be used to implement any aspect of the features shown in the foregoing drawings.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing system for automatically generating questions pertaining to an identified document. Section B sets forth illustrative methods that explain the operation of the question-generating system of Section A. And Section C describes illustrative computing functionality that can be used to implement any aspect of the features described in Sections A and B.

A. Illustrative Computing System

Figure 1:
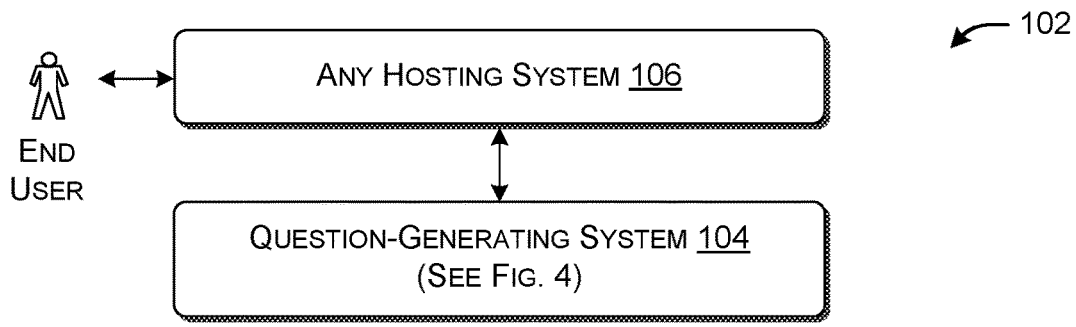
FIG. 1 shows a computing environment that uses a question-generating system.

FIG. 1 shows a computing environment 102 that uses a question-generating system 104 to generate questions regarding an identified electronic document ("document" hereinafter). The computing environment 102 includes a hosting system 106 that performs any application function or combination of functions. The hosting system 106 uses the question-generating system 104 in the course of performing its function(s).

In some cases, the hosting system 106 and the question-generating system 104 are implemented as separate respective program modules. For example, the question-generating system 104 may correspond to a program resource in a library of resources. Any system, including the hosting system 106, may make program calls to the question-generating system 104. In other cases, the question-generating system 104 corresponds to a dedicated resource of the hosting system 106, and thus may be interpreted as an "internal" component of the hosting system 106.

Figure 2:
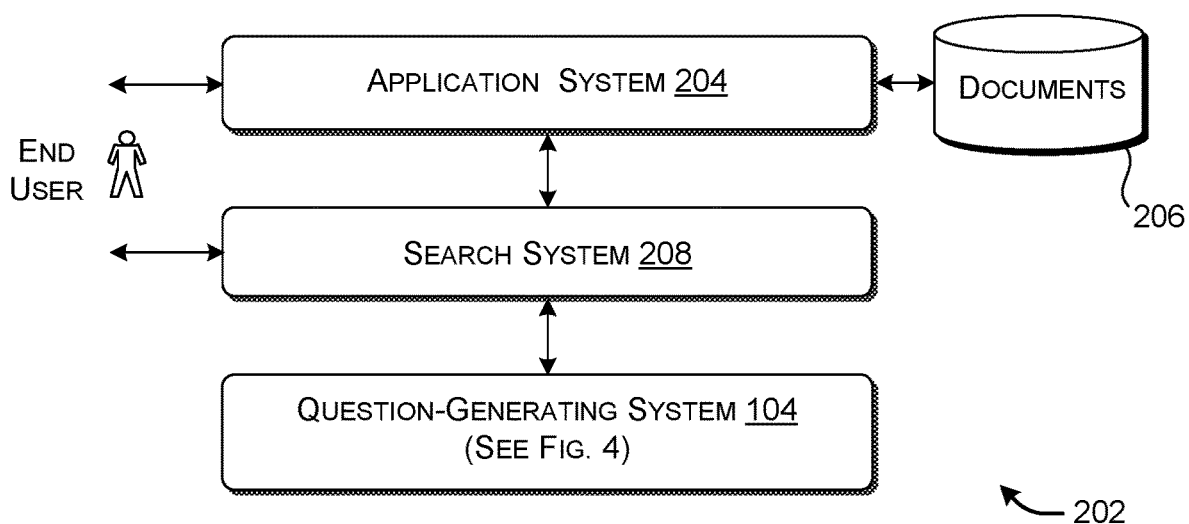
FIG. 2 shows another computing environment that uses the question-generating system.

FIG. 2 shows another illustrative computing environment 202 that makes use of the question-generating system 104, which can be considered one specific instantiation of the more general computing environment 102 of FIG. 1. In this example, an application system 204 allows a user to perform any type of function or combination of functions with respect to a document. For example, the application system 204 may correspond to a word processing program that allows a user to create and edit documents, and/or view previously-created documents. In another example, the application system 204 may correspond to a dedicated viewer program that allows a user to view and interact with documents expressed in a particular format, such as the Portable Document Format (PDF). In another example, the application system 204 may correspond to a web browsing program that allows a user to view and interact with web pages accessible over a wide area network (such as the Internet). A data store 206 represents any repository (or plural repositories) of documents, any of which can be acted on by the application system 204.

A search system 208 allows the application system 204 to search for information within a document. For example, the search system may implement a function hosted by a word processing program that allows a user to find a passage within a document. In one non-limiting case, the user may invoke the search system 208 within the word processing program by activating a particular command, such as by simultaneously pressing the control ("Ctrl") and "F" keys on a keyboard. Once invoked, the search system 208 can generate and display a control element. The control element serves as an interface through which the user may interact with the search system 208.

In one implementation, once invoked, the search system 208 calls on the question-generating system 104 to generate a set of output questions. The question-generating system 104 produces the output questions based on text within the document. The search system 208 may then display the output questions to the user via the control element. The output questions serve as suggestions, guiding the user on how he or she may interrogate the document.

In some implementations, the search system 208 is built as a dedicated resource of the application system 204. In other implementations, the search system 208 serves as a more general utility program that can be accessed by plural different types of application systems, such as a word processing program and a web browser program. Likewise, the question-generating system 104 can be viewed as a dedicated resource of the search system 208 or a more general resource that can be accessed by plural programs.

Figure 3:
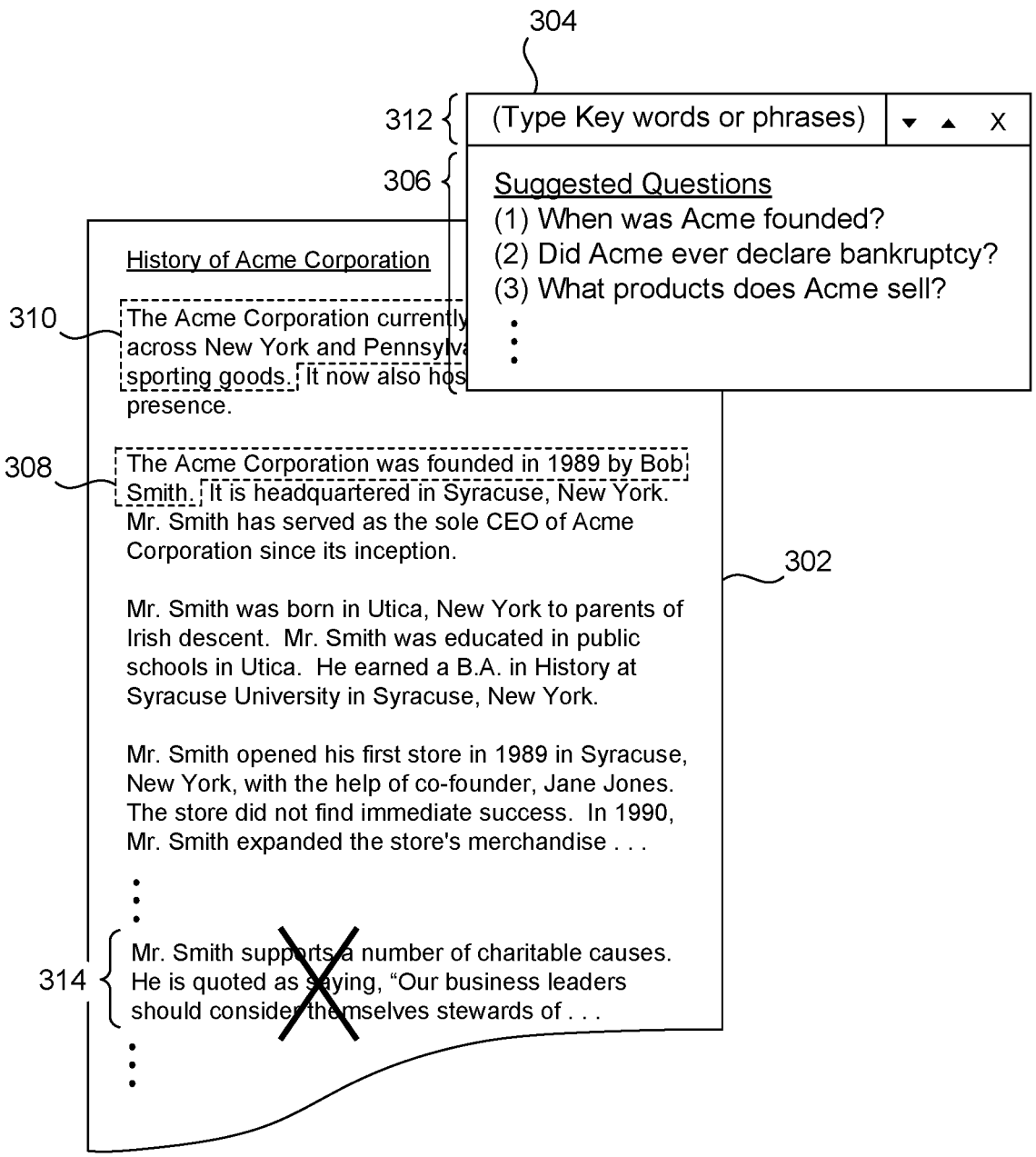
FIG. 3 shows an example of output results produced by the computing environment of FIG. 2.

FIG. 3 shows an example a user interface presentation produced by the application system 204 and the search system 208 of FIG. 2. Once invoked by the application system 204, the search system 208 performs a search within a document 302. In one example, the application system 204 is a word processing program and the document 302 is an editable textual document. More specifically, assume that the document 302 describes the history of a particular company, the "Acme Corporation." Further assume that the document 302 includes text that is made up of plural passages. The term "passage" generally refers to any prescribed unit of text within a document 302. For example, in some implementations, passages may refer to individual paragraphs. In other implementations, passages may refer to individual sentences, etc. In any event, different passages typically convey different facts about a topic of the document 302. Further, as recognized by the inventors, some passages are particularly rich in semantic content that can be mined to generate questions, while other passages are not as well suited for generating passages.

The search system 208 can display a control element 304 once it is invoked by the application system 204. In FIG. 3, the control element 304 corresponds to a graphical panel that may be presented in a peripheral region of the user interface presentation, e.g., near the side of document 302 itself. The control element 304 can include a section 306 that displays zero, one, or more output questions. The question-generating system 104 automatically generates the questions based on the text in the document 302. Generally, the question-generating system 104 chooses output questions that can be answered by facts presented in the document 302. For example, a first question ("When was Acme founded?") is produced based on a fact specified in a particular passage 308 of the document 302. A third question ("What products does Acme sell?") is produced based on a fact specified in another passage 310 of the document 302.

A user may respond to the output questions in the section 306 by clicking on or otherwise selecting one of the output questions. In response, the search system 208 may highlight a passage in the document that answers the question. In some implementations, the control element 304 also includes a query section 312 that allows a user to type one or more targeted inquiries regarding the document. In response, the search system 208 can rank the output questions in the section 306 based on their relevance to the query. For example, assume that the user types "bankruptcy" into the query section 312. In response, the search system 208 can elevate the second question ("Did Acme ever declare bankruptcy?") to the top-ranking entry in the list of questions because it is lexically and/or semantically most relevant to the query "bankruptcy." In addition, the search system 208 can highlight any passage(s) in the document 302 that are relevant to the top-ranked question and/or the entered query ("bankruptcy"). However, note that the search system 208 can present output questions regardless of whether the user chooses to input a query in the query section 312.

As will be clarified below in greater detail, the question-generating system 104 begins its analysis by identifying a subset of the passages in the document 302 that will be most productive in generating questions. Then, in subsequent stages of analysis, the question-generating system 104 will selectively process only those passages. For example, assume that the question-generating system 104 flags a particular passage 314 as being unlikely to contribute to the generation of an output question. In response, the question-generating system 104 will not devote further system resources (e.g., processor resources, memory resources, etc.) for processing this particular passage 314. More specifically, the particular passage 314 is not empty from a semantic standpoint, but nonetheless expresses the kind of information that does not readily lend itself to the generation of questions (e.g., in this case because it is devoted to describing a person's abstract philosophical thoughts on a particular topic that cannot be easily condensed into concise fact-based questions).

The example of FIG. 3 should be interpreted in the spirit of illustration, not limitation. Other implementations can vary the visual appearance of the control element 304 in any way. In addition, or alternatively, other implementations can vary the behavior of the control element 304 in any way. In still other implementations, the search system 208 provides a control element that conveys information in audible form, e.g., by speaking the output questions to the user. For example, the search system 208 can speak the following illustrative message when the user accesses the document 302: "Do you want to know when Acme was founded? If so, say 'yes'. If not, please say 'another suggestion'."

More generally stated, the implementation of FIGS. 2 and 3 is just one of many applications of the question-generating system 104. In another implementation, a testing-related application system relies on the question-generating system 104 to pose questions regarding a document to a user. For instance, the testing-related application system can use the questions to gauge the user's comprehension of the document, or to simply test whether the user has read the document. In other implementations, a dialog management system can use the question-generating system 104 in an attempt to answer a user's query about a document. For example, assume that the user is asking a question about a complex tax document. The application system can generate likely questions about the tax document, and then present the question that most likely matches the user's query. For example, if the user input the query phrase "deductions for adult son," the application system can respond by saying, "Do you want to know where this document describes the conditions under which an adult child may be claimed as a dependent?" Alternatively, or in addition, a reader can rely on the output questions as a convenient summary of the main facts expressed in a document.

In another implementation, an application system can use the question-generating system 104 to give a document author or disseminator insight as to what questions may arise to a reader of the document. The document author or disseminator may use this insight to modify the document to better answer the questions, or to otherwise proactively attempt to answer the questions for the readers. Alternatively, or in addition, the question-generating system 104 may generate one or more ill-formed questions because portions of the document are poorly written and ambiguous. The document author can use this outcome as a guide to revising the document to improve its clarity. Alternatively, or in addition, a document author or reviewer can use the questions to highlight the presence of factual statements within the document. The document author or reviewer can use the questions in an effort to verify the facts in the document, e.g., as part of a quality control process. Still other implementations are possible.

Figure 4:
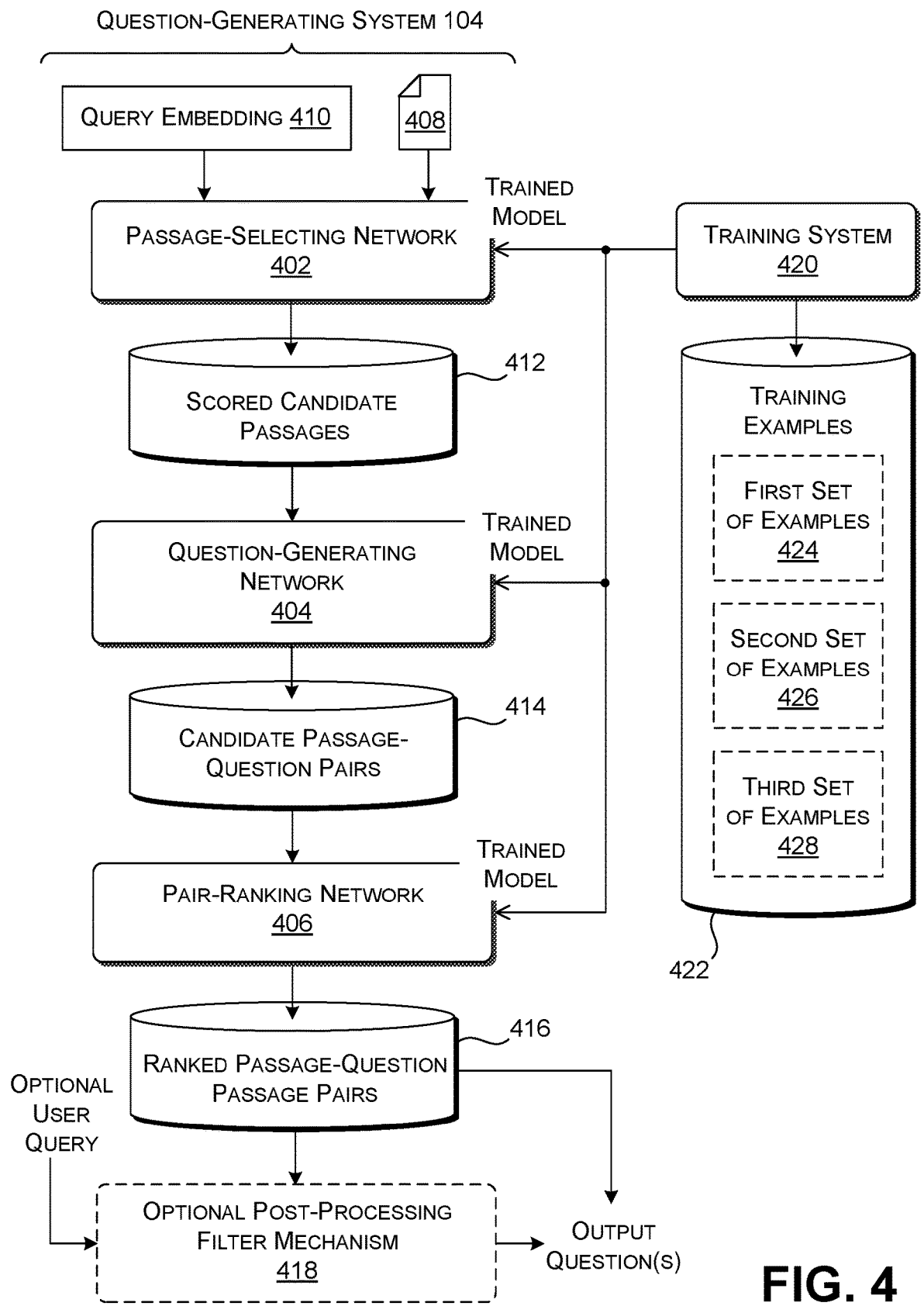
FIG. 4 shows one implementation of a three-stage question-generating system.

FIG. 4 shows one implementation of the question-generating system 104. Here, the question-generating system 104 is implemented using one or more machine-learned models. For example, the question-generating system 104 can be implemented as a neural network that is made up of one or more neural networks. (A "machine-learned model," as that term is used herein, refers to a model that has been produced using a machine-learning process. Any mention of a neural network is meant to encompass a neural network that performs any function or combination of functions, and which has one or more layers of any type or combination of types, e.g., linear layer(s), non-linear layer(s), etc.)

More specifically, in one implementation, the question-generating system 104 operates in three stages implemented by three respective neural networks. A passage-selecting network 402 performs the first stage, a question-generating network 404 performs the second stage, and a pair-ranking network 406 performs the third stage. FIG. 4 provides an overview of the question-generating system 104 as a whole, while FIGS. 5-10 provide details regarding individual stages in the question-generating system 104. To simplify the explanation, the question-generating system 404 will be described below as operating on tokens that represent respective words. But in other implementations, the question-generating network 404 operates on tokens that represent fragments of words, not necessarily complete words. Thus, the term "token" is meant to encompass any representation of a word or a part of a word.

Starting at the top of FIG. 3 and working down, the passage-selecting network 402 receives as input a document 408. The document 408 can refer to a collection of textual passages having any scope. In some cases, the document 408 corresponds to a single electronic file containing text having any number of pages and any structure, such as a single file produced by a word processing program, or a single file that describes a web page, etc. In other cases, the document 408 can refer to a part of a single file containing text, or multiple files containing text. The following explanation will be based on the non-limiting assumption that the document 408 corresponds to a single file containing text.

The passage-selecting network 402 also optionally receives a query embedding 410. In some implementations, the passage-selecting network 402 randomly selects the query embedding 410 from a distribution of query embeddings produced in a training phase. Additional information regarding the query embedding 410 will be set forth below in conjunction with FIG. 5. At this juncture, suffice it to say that the query embedding 410 represents a single float value (or vector) that the passage-generating network 402 is configured to receive by virtue of how it was trained. But the query embedding 410 itself does not strongly correlate to any specific semantic content. In other words, it generally serves to target passages that are good candidates for answering questions, without strongly narrowing the focus to particular types of passages or questions.

The passage-selecting network 402 responds to the above-described input information by producing a score for each passage in the document 408. The score identifies the assessed ability of the passage to generate output questions. In other words, the score reflects how useful the passage will be in generating productive output questions. The passage-selecting network 402 stores the scores it produces in a data store 412. More specifically, in some implementations, the passage-selecting network 402 stores information regarding the n passages in a document having the highest scores (where n is an environment-specific value). Alternatively, the passage-selecting network 402 may store information regarding all of the passages that have scores above a prescribed environment-specific threshold value. These passages are referred to herein as scored candidate passages. In many cases, the scored candidate passages will correspond to a subset of the total number of passages in the document 408, where the subset has fewer passages than the total number.

The question-generating network 404 uses a machine-learned model to generate one or more candidate questions for each scored passage identified in a data store 412. In some implementations, the model autoregressively generates each candidate question based on a particular candidate passage. That is, the query-generating network 404 can generate each candidate answer in token-by-token fashion based on a particular candidate passage. The question-generating network 404 stores a plurality of candidate passage-question pairs in a data store 414. Each such pair includes a candidate passage identified by the passage-selecting network 402 together with a candidate answer generated by the question-generating network 404. As will be clarified below, the question-generating network 404 can use a beam search algorithm to produce plural questions for each individual candidate passage.

The pair-ranking network 406 generates a score for each candidate passage-question pair in the data store 414. For a particular pairing of a particular candidate passage and a particular candidate question, the score reflects the relevance of the candidate passage to the candidate question. In other words, the score reflects how well the candidate passage can be said to answer the candidate answer. The pair-ranking network 406 stores ranked passage-question pairs in a data store 416. More specifically, the passage-ranking network 406 can store information regarding the m candidate passage-question pairs having the highest scores (where m is an environment-specific value). Alternatively, the passage-ranking network 406 can store all of the candidate passage-question pairs that have scores above a prescribed environment-specific threshold value. In some cases, the ranked passage-question pairs stored in data store 416 represent a subset of the total number of candidate passage-question pairs stored in the data store 414.

The search system 208 (or other hosting system 106) may choose one or more output questions from the ranked passage-question pairs in the data store 416, e.g., by selecting questions associated with a prescribed number of top-ranked passage-questions pairs. Alternatively, a post-processing filter mechanism ("filter mechanism" for brevity) 418 can re-rank the questions based on one or more factors. For example, assume that the user inputs a query term (or terms) in the query section 312 of the control element 304 (of FIG. 3). In response, the filter mechanism 418 can re-rank the candidate questions based on their suitability to the input query term(s). For example, the filter mechanism 418 can rank each candidate question based on its lexical and/or semantic similarity to the query term(s). Without limitation, one way of determining lexical similarity is by computing the edit distance between the input query term(s) and the candidate question. One way of determining the semantic similarity is by mapping the input query term(s) and the candidate question to two respective vectors in a semantic space and then computing the cosine similarity (or other distance metric) between the two vectors. A machine-learned model can be used to map linguistic information into vectors in the semantic space.

In other implementations, the filter mechanism 418 can use one or more additional factors in determining how to re-sort the output questions, including any environment-specific context factors. If authorized by a particular user, the contextual factors can include information that describes any of the location of the user, the time of day, the prior search behavior of the user, the interests of the user (which is information that can be mined from the profile of the user), and so on.

A training system 420 produces one or more machine-learned models that govern the operation of the question-generating system 104. The training system 420 can produces the model(s) in an offline training operation. In addition, the training system 420 can dynamically update the model(s), e.g., either on a periodic or continuous basis.

Generally, the training system 420 produces each model by iteratively operating on a set of training examples in a data store 422. The training system 420 adjusts a set of weighting values of the model after each iteration of the training process, guided by the goal of minimizing or maximizing some specified loss function that expresses a training objective. The training system 420 can perform this iterative process using any training technique, such as the well-known stochastic gradient descent technique. The model itself is made up of a final set of weighting values produced by the iterative process.

More specifically, in some implementations, the training system 420 separately produces three trained models for respective use by the passage-selecting network 402, the question-generating network 404, and the pair-ranking network 406. The training system 420 can produce these three models using three respective sets of training corpuses (424, 426, 428). The training system 420 can also apply three respective loss functions to produce its stage-specific models. Additional information regarding these stage-specific training processes will be set forth below in the course of explaining each respective stage.

Further, the training system 420 can optionally perform training by starting with a previously-trained base model. That is, in a preliminary training process, another training system (not shown) can train a base model that performs one or more language-modeling tasks, such as predicting masked (omitted) words in a sentence, and predicted a next sentence to follow a specified initial sentence. To implement each model of the question-generating system 104, an engineer may add one or more specialized classification layers to the "top" of the base model, which operate on output information generated by the base model. In this context, the training system 420 operates by refining the weighting values in the base model and the newly-added classification layer(s). Alternatively, or in addition, the training system 420 can produce one or more models of the question-answering system 104 from "scratch," that is, without reference to a previously trained base model.

In one non-limiting and optional implementation, a conversion mechanism (not shown) can convert the models produced by the training system 420 from a first native format to a second standardized format, such the standardized format described in the Open Neural Network Exchange (ONNX). The ONNX standard represents the models as data flow graphs. The question-generating system 104 can implement the converted models using, at least in part, any kind of processing acceleration hardware, e.g., one or more Graphics Processing Units (GPUs), one or more Neural Processing Units, one or more Feld-Programmable Gate Arrays, etc.

Figure 5:
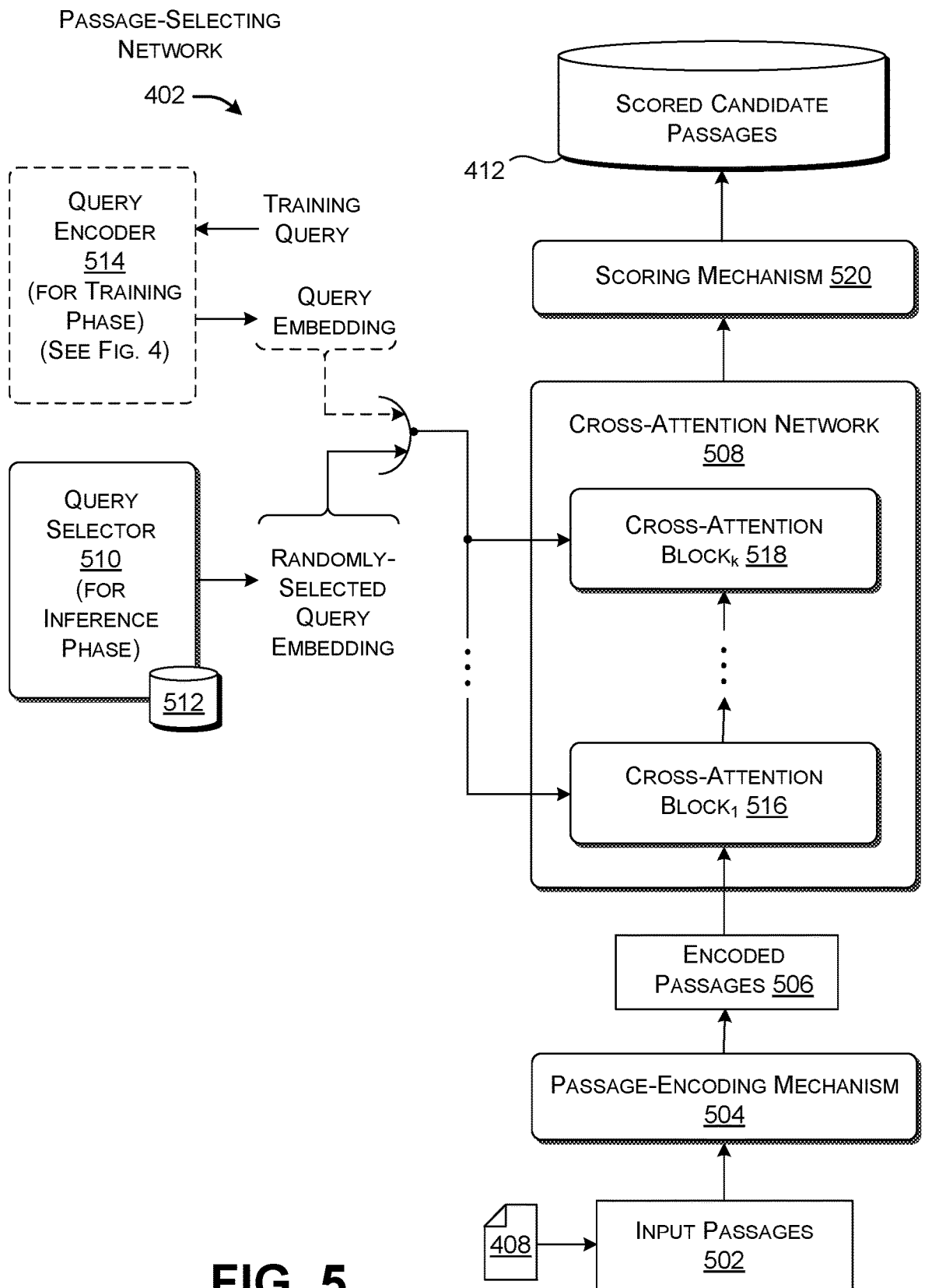
FIG. 5 shows one implementation of a passage-selecting network for use in a first stage of the question-generating system of FIG. 4.

FIG. 5 shows one implementation of the passage-selecting network 402. To repeat, the purpose of the passage-selecting network 402 is to rank individual passages in the input document 408 based on their assessed capacity to generate meaningful questions about the document 408.

To begin with, the question-generating system 104 can use any type of segmentation algorithm to break the text in the document 408 into its constituent passages 502. For example, the segmentation algorithm can identify passages associated with each paragraph of the input document, or each sentence, etc. The question-generating system 104 can represent each passage as a series of token vectors that respectively represent the words (or word fragments) in the passage. For example, the question-generating system 104 can use a neural network, hashing function, lookup table, etc. to convert each word in a passage to a token vector counterpart.

The passage-selecting network 402 can use a passage-encoding mechanism 504 to encode the plural input passages 502 into respective encoded passages 506. In some implementations, the passage-encoding mechanism 504 is a neural network having one or more layers that converts the token vectors associated with each passage into a single passage vector that represents the entirety of the passage.

A cross-attention network 508 accepts the encoded passages 506 as input, along with a query embedding. In some non-limiting implementations, a query selector 510 randomly selects the query embedding from a distribution of possible query embeddings stored in a data store 512. A query encoder 514 generates the distribution of query embeddings in a prior off-line training process. The query encoder 514 will be explained in detail below with reference to FIG. 6.

In one implementation, the query embedding that is passed to the cross-attention network 508 is a single float value. In another implementation, the query embedding is a vector. In any event, the query embedding will be effective in pinpointing passages in the input document 408 that will be useful to mine for questions; but the query embedding will not otherwise have a strong correlation with any specific semantic content in the document 408. In alternative implementations, the query selector 510 can be configured to select two or more query embeddings from the distribution in the data store 512.

The cross-attention network 508 applies one or more attention blocks (516, . . . , 518) to operate on the encoded passages 506 and the query embedding. Generally, an attention block computes attention information by determining how much focus to place on each encoded passage when interpreting the query embedding. Each attention block can therefore be said to assess the significance of each encoded passage, relative to the query embedding. In one non-limiting implementation, the first attention block 516 can compute the attention information attn(Q, K) using the following equation:

$$attn(Q, K) = softmax\left(\frac{QK^T}{\sqrt{d}}\right). \quad (1)$$

Here, Q expresses query information that is produced by multiplying the query embedding by a machine-learned query weighting matrix $W^Q$. K refers to key information that is produced by multiplying a matrix that packs together the encoded passages 506 by a machine-learned key weighting matrix $W^K$. Equation (1) takes the dot product of Q with the transpose of K, and then divides this product by a scaling factor $\sqrt{d}$, where d may represent the dimensionality of the machine-learned model. This operation produces a scaled result. Equation (1) then generates the normalized exponential function (softmax) of the scaled result to produce the attention information. Each subsequent attention block operates on attention information produced by a preceding attention block.

In some implementations, the cross-attention network 508 can perform the operations of Equation (1) for different respective heads, where each head corresponds to a different representational subspace associated with its own machine-learned weighting values. The cross-attention network 508 then combines the attention information produced by the different heads, e.g., by concatenating this head-specific attention information.

A scoring mechanism 520 can produce a score for each passage based on attention information produced by the cross-attention network 508. In one implementation, the scoring mechanism 520 can include another neural network having one or more layers followed by a softmax function.

Other implementations of the passage-selecting network 402 can use other respective types of machine-learned models. For example, other implementations can use a Convolutional Neural Network (CNN), a Recurrent Neural Network (RNN), etc.

In one implementation, the training system 420 (of FIG. 4) can train a model for use by the passage-selecting network 402 based on a set of training examples provided by a search engine's search log. Each such training example may include a query submitted by a user together with a passage in a document that has been identified by the search engine as being relevant to the query. In addition, or alternatively, at least some of the training examples may include manually-created pairings of queries and passages. The training system 420 trains the model to maximize the likelihood that the model will correctly identify the relevance of a query embedding (produced based on a query) and an identified passage.

Figure 6:
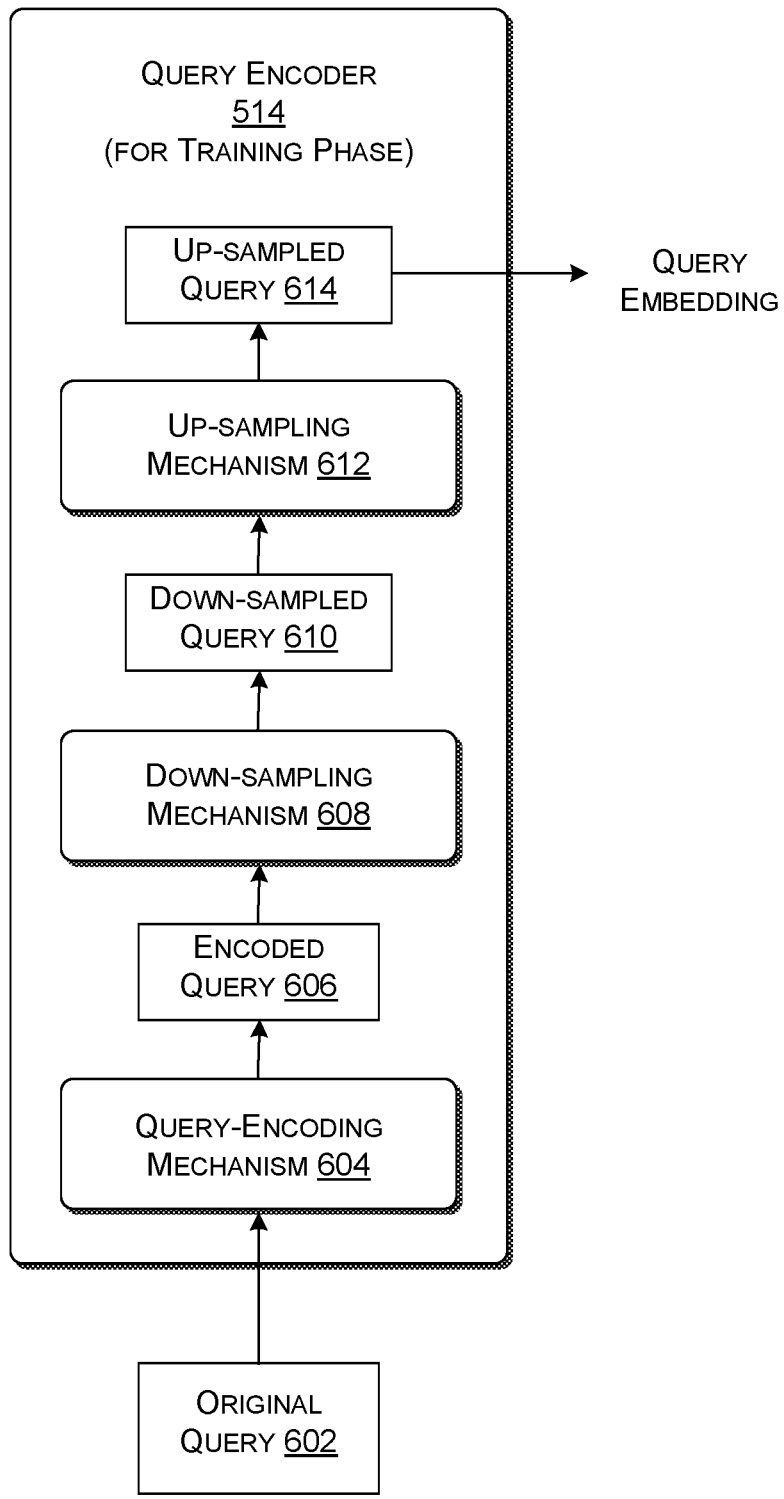
FIG. 6 shows a query encoder for use in encoding an input query in a training phase. In one implementation, in the inference phase, the passage-selecting network of FIG. 5 randomly selects from among query embeddings produced by the query encoder of FIG. 6.

FIG. 6 shows one implementation of the query encoder 514 that is used by the training system 420 in the training phase to map an original query 602 into a query embedding. Recall that the query encoder 514 is not used in the inference phase. Rather, in the inference phase, the query selector 510 randomly selects a query embedding from a distribution in the data store 512.

The query encoder 514 includes a query-encoding mechanism 604 that operates in the same manner as the passage-encoding mechanism 504. That is, the query-encoding mechanism 604 can convert the token vector(s) associated with the original query 602 into an encoded query 606, which may correspond to a single vector. The query-encoding mechanism 604 can perform this operation using a neural network having one or more layers. A down-sampling mechanism 608 can then use another neural network to convert the encoded query 606 into a down-sampled query 610. The down-sampled query 610 has a smaller dimensionality than the encoded query 606. For example, in one implementation, the down-sampled query 610 corresponds to a single float value. In another implementation, the down-sampled query 610 corresponds to a smaller vector than the encoded query 606. An up-sampling mechanism 612 then uses another neural network to convert the down-sampled query 610 into an up-sampled query 614. The up-sampled query 614 is a vector that constitutes a representation of the original query 602 having a higher dimensionality compared to the down-sampled query 610. The up-sampled query 614 also constitutes the query embedding that is fed to the cross-attention network 508. The purpose of the successive down-sampling and up-sampling operations is to broaden the semantic focus of the resultant query embedding, e.g., such that it is effective in identifying a passage that can generate a question, but does not otherwise narrowly target specific semantic content. In other words, the purpose of the down-sampling and up-sampling operations is to spread out the semantic focus of the original query 602, such that it maps to a larger region of a semantic space then it otherwise would.

Figure 7:
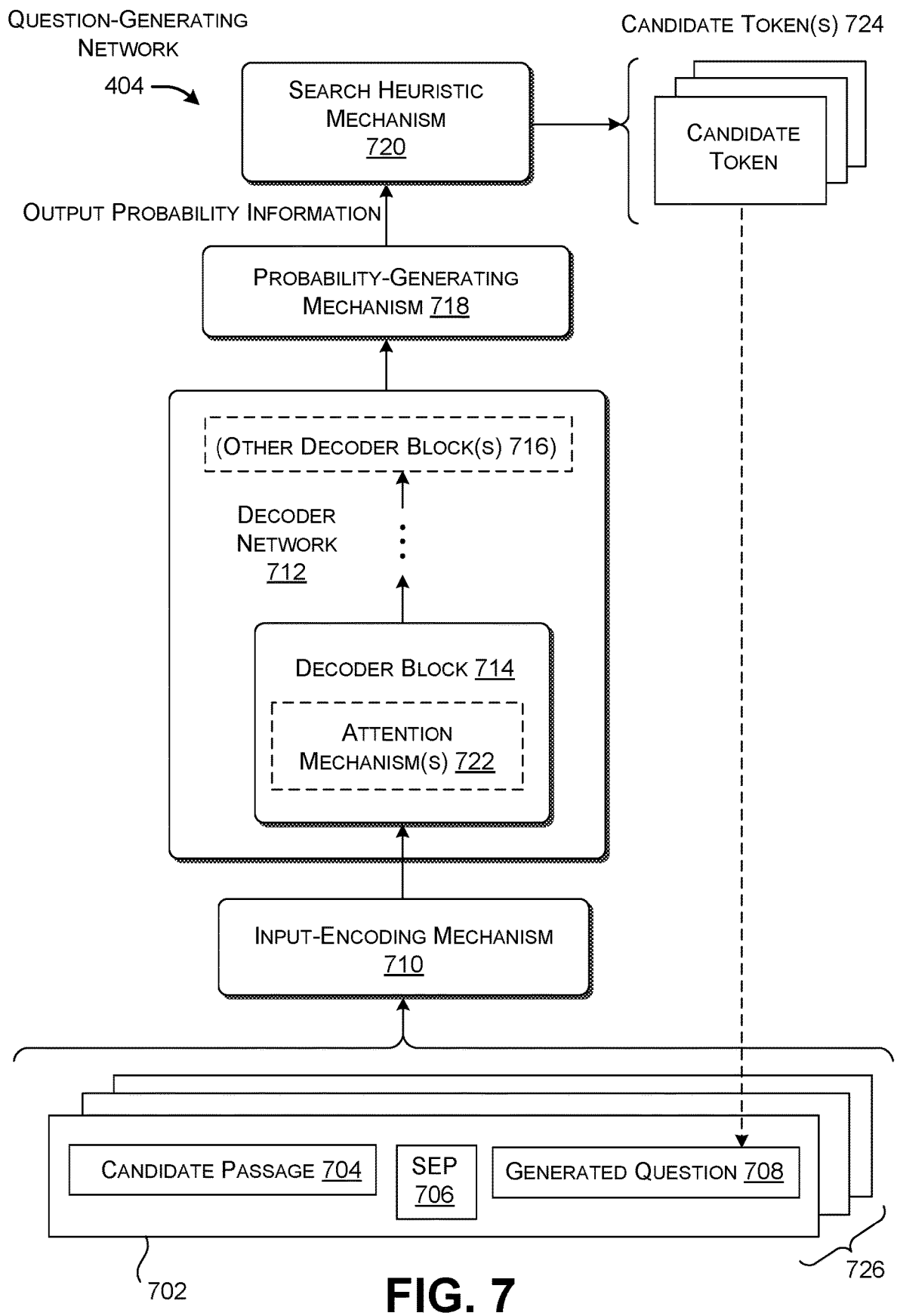
FIG. 7 shows one implementation of a question-generating network for use in a second stage of the question-generating system of FIG. 4.

FIG. 7 shows one implementation of the question-generating network 404. Recall that the purpose of the question-generating network 404 is to generate one or more questions for at least some of the top-ranked passages identified by the passage-selecting network 402. In the specific example of FIG. 7, the question-generating network 404 autoregressively generates each question for an identified candidate passage in token-by-token fashion. Assume, in this example, that the question-generating network 404 operates on an instance of input information 702 that includes a candidate passage 704 made up of one or more tokens, a separator token 706, and a generated question 708 (which may eventually include one or more tokens, but is originally empty, having no tokens).

In greater detail, the question-generating network 404 can include any input-encoding mechanism 710 for converting the tokens in the input information 702 into respective input vectors. A decoder network 712 uses one or more decoder blocks (such as representative decoder block 714 and other decoder block(s) 716) to convert the input vectors into decoder output information. A probability-generating mechanism 718 converts the decoder output information into a probability distribution. The probability distribution provides probabilities associated with tokens in a vocabulary. Each probability identifies the likelihood that an associated token (e.g., a particular word) represents the next token in the generated question 708. In some implementations, the probability-generating mechanism 718 includes one or more neural network layers followed by a softmax operation.

A search heuristic mechanism 720 then applies a search heuristic to select one or more next tokens based on the probabilities. In some cases, the search heuristic mechanism 720 applies a greedy selection algorithm to select the single token that has the highest probability. The question-generating network 404 adds this token to the end of the generated question 708 to produce updated input information 702. The question-generating network 404 then repeats the above-described process for the updated input information 702. The question-generating network 404 terminates its processing for the question under construction when it predicts an end-of-sequence token.

Each decoder block can include an attention mechanism. For instance, the first decoder block 716 includes a representative attention mechanism 722. In one implementation, the attention mechanism 722 of the first decoder block 716 generates attention information using the following equation:

$$attn(Q, K, V) = softmax\left(\frac{QK^T}{\sqrt{d}}\right)V. \quad (2)$$

In this case, the query information Q is produced by multiplying a last-introduced token of the input information 702 by a query weighting matrix $W^Q$. Key information K and value information V are produced by multiplying the vectors associated with the input information 702 as a whole by a key weighting matrix $W^K$ and a value weighting matrix $W^V$, respectively. Equation (2) otherwise involves some of the same operations as Equation (1), described above. Those operations include taking the dot product of Q by the transpose of K, and then dividing that dot product by a scaling factor $\sqrt{d}$, where d may represent the dimensionality of the machine-learned model. This yields a scaled result. Equation (2) then involves computing the softmax of the scaled result, and then multiplying the result of the softmax operation by V.

Each subsequent decoder block in the decoder network 712 operates in the same manner as the first decoder block 714. However, each subsequent decoder block builds the query information Q, key information K, and value information V based on the output of a preceding decoder block.

As noted above, in a greedy selection algorithm, the search heuristic mechanism 720 selects a single token having the highest probability. In other implementations the search heuristic mechanism 720 applies a beam search algorithm to select k candidate tokens 724 having the highest conditional probabilities, where k>1. The number of tokens selected is governed by a beam width. Correspondingly, at each iteration, the question-generating network 404 processes k instances of input information 726. Each instance of input information includes a different candidate question which terminates in one of the k candidate tokens 724 identified by the beam search algorithm.

Figure 8:
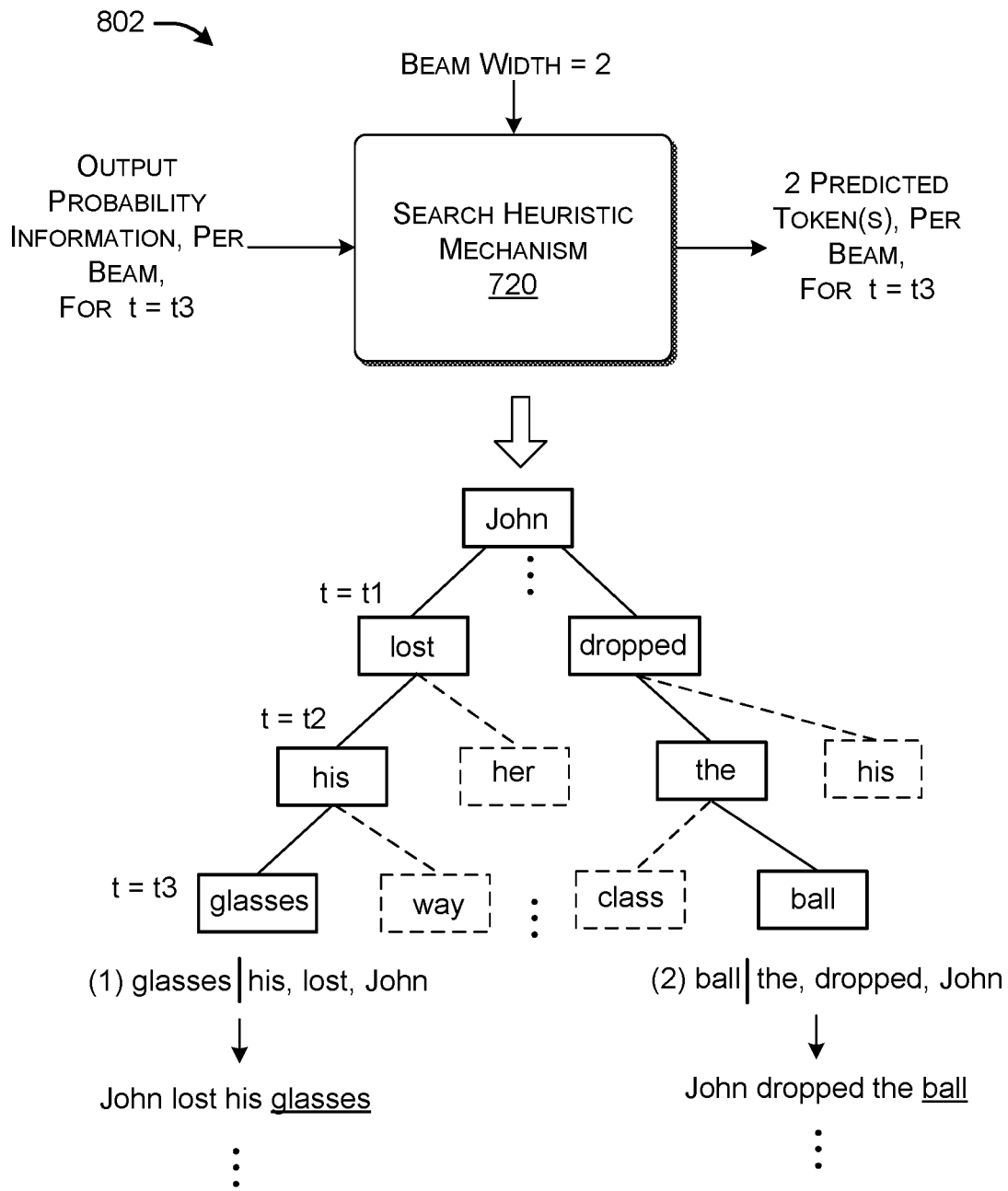
FIG. 8 shows an example of the operation of a beam search algorithm. The beam search algorithm operates on output probabilities produced by the question-generating network of FIG. 7.

FIG. 8 shows an example 802 that illustrates the operation of the search heuristic mechanism 720 for the illustrative case in which a beam search algorithm is used, with a beam width set to 2. The beam search algorithm receives output probabilities produced by the probability-generating mechanism 718. The beam search algorithm determines the likelihood of each candidate token as a conditional probability, taking into account both the probability score of a candidate token under consideration and the probability scores of the words in a search path that leads to the candidate token under consideration.

For example, at time t=t3 (corresponding to a particular iteration of the question-generating network 404), assume that there are two incomplete question candidates that remain active. The first candidate is "John lost his". The second candidate is "John dropped the." These questions reflect the current state of two paths (or "beams") through a linguistic search tree, a small part of which is shown in FIG. 8. The question-generating network 404 will generate output probabilities for each of these two candidates, e.g., in series or in parallel. For the first path ("John lost his"), assume that the beam search algorithm identifies two candidate tokens that have the highest conditional probability, the first being "glasses" and the second being "way". For the second path ("John dropped the"), assume that the beam search algorithm identifies another two candidate tokens as having the highest conditional probabilities, the first being "class," and the second being "ball." Because the beam search algorithm has a beam width of 2, the beam search algorithm chooses the two candidate tokens that have the highest probability. Assume that the winning candidates are "glasses" and "ball". In the next iteration of the question-generating algorithm, the question-generating network 404 will identify two candidate tokens for "John lost his glasses" and another two candidate tokens for "John dropped the ball". This process continues until end-of-sequence tokens are predicted for the respective beams. (Assume that each finished generated phrase expresses a question, such as "John dropped the ball in what inning of the game?") Overall, the use of the beam search algorithm allows the question-generating system 104 to generate plural questions for a single passage in a resource-efficient and time-efficient manner.

The training system 420 (of FIG. 4) can train the question-generating network 404 using any set of training examples that includes pairing of questions and answers. The training examples can be mined from any engine that relies on establishing a relationship between queries and passages. For example, a click log of a search engine identifies different queries that have been submitted by users and which were followed by the users clicking on a particular document passage. The training system 420 can use this evidence to produce pairings between those queries and the particular document passage. In addition, or alternatively, at least some of the training examples may include manually-created pairings of questions and passages. The training system 420 trains a model to maximize the likelihood that the model will correctly generate the questions in the set of training examples, given the corresponding passages in the set of training examples.

Other implementations of the question-generating network 404 can use other types of machine-learned models. For example, another implementation of the question-generating network 404 can use an RNN. Each processing block of the RNN can be implemented by a Long Short-Term Memory (LSTM) unit.

Figure 9:
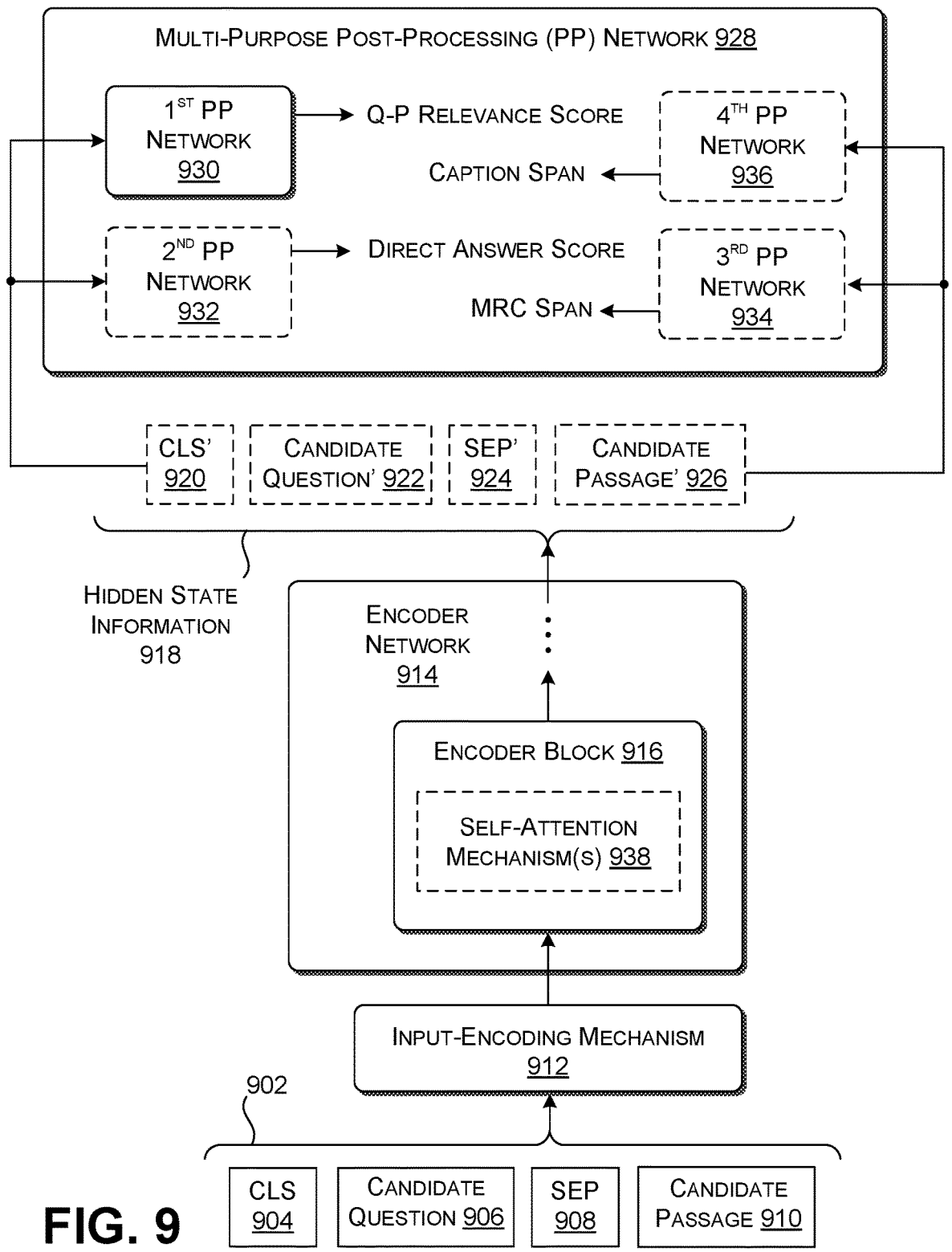
FIG. 9 shows one implementation of a pair-ranking network for use in a third stage of the query-generating system of FIG. 4.

FIG. 9 shows one implementation of the pair-ranking network 406. Recall that the purpose of the pair-ranking network 406 is to generate a score for each candidate passage-question pair produced by the question-generating network 404. For a given pairing of a particular candidate passage and a particular candidate question, the score reflects an extent to which the particular candidate passage is deemed relevant to the particular candidate question.

FIG. 9 specifically shows the case in which the pair-ranking network 406 maps a particular candidate passage-question pair 902 into a score. In one non-limiting implementation, the candidate passage-question pair 902 includes a classification token ("CLS") 904, followed by a candidate question 906, followed by a separator token ("SEP") 908, followed by a candidate passage 910. An input-encoding mechanism 912 converts the candidate passage-question pair 902 into a series of input vectors associated with the respective words (or word fragments) in the candidate passage-question pair 902. The input-encoding mechanism 912 can perform this conversion task using a neural network having one or more layers.

An encoder network 914 uses one or more encoder blocks (such as representative encoder block 916) to convert the input vectors into hidden state information. The hidden state information 918 includes counterpart output vectors associated with the words in the candidate passage-question pair 902. For instance, the hidden state information 918 includes: (1) a CLS output vector 920 that is the hidden state counterpart of the CLS token 904; (2) one or more question output vectors 922 that are respective hidden state counterparts of the tokens that make up the candidate question 906; (3) a SEP output vector 924 that is the hidden state counterpart of the SEP token 908; and (4) one or more passage output vectors 926 that are respective hidden state counterparts of the tokens that make up the candidate passage 910.

A multi-purpose post-processing network ("PP network" for brevity) 928 further processes selected parts of the hidden state information 918 to generate one or more conclusions. For instance, a first PP network 930 generates a score for the candidate passage-question pair 902 that describes the relevance of the candidate passage 910 to the candidate question 906. The first PP network 930 can be implemented as a neural network having one or more layers. The first PP network 930 operates by mapping the CLS output vector 920 to a score.

Optionally, the PP network 928 can include other sub-components that perform other classification tasks. Each of the other sub-components can be implemented as a neural network having one or layers. For instance, a second PP network 932 maps the CLS output vector 920 into a score that reflects the likelihood that the candidate passage 910 contains a direct answer to the candidate question 906. For instance, a passage that contains the text "Bill Jones was born on Jul. 10, 1967" is a direct answer to the question, "In what year was Bill Jones born?"

A third PP network 934 identifies a portion of the candidate passage 910 that is most relevant to the candidate question 906. For example, consider the question, "In what year was Bill Jones born?" and the passage, "Bill Jones was born in July of 1967, one year after Bill Sr. returned from overseas deployment." The third PP network 934 can identify "Bill" as the start of the most relevant passage" and "1967" as the end of the most relevant passage. More specifically, the third PP network 934 can generate a score for each passage output vector (in the set of passage output vectors 926) that indicates the likelihood that it represents the start of the most relevant part of the candidate passage 910. The third PP network 934 can generate another score for each passage output vector that indicates the likelihood that it represents the end of the most relevant passage. The third PP network 934 chooses the tokens having the highest probabilities to find the start and end of the most relevant passage.

A fourth PP network 936 generates a score for each passage output vector that indicates the likelihood that its corresponding passage token is a key term (with respect to the question being asked). For example, in the example specified in the preceding paragraph, the fourth PP network 936 can assign the words "born" and "1967" relatively high scores, and the words "overseas" and "deployment" relatively low scores.

In one implementation, the question-generating system 104 may only directly utilize the output of the first PP network 930 to perform its core task of generating output questions. Nevertheless, it is useful to train the pair-ranking network 406 to perform plural classification tasks because doing so will improve the robustness and quality of the first PP network 930. The question-generating system 104 can optionally also use the output of the third PP network 934 to highlight the relevant parts of a document. For instance, the question-generating system 104 can highlight the most relevant part of a sentence when the user selects a question having an answer within that paragraph.

Each encoder block of the encoder network 914 can include at least one attention mechanism. For example, the representative encoder block 916 includes at least one attention mechanism 938. In one implementation, the attention mechanism 938 performs self-attention using Equation (2). In this context, the attention mechanism 938 can generate the query information Q, key information K, and value information V by multiplying input vectors associated with the candidate passage-question pair 902 by three respective weighting matrices ($W^Q$, $W^K$, $W^V$).

The pair-ranking network 406 can be trained based on any set of mined and/or manually-produced training examples. In one implementation, the pair-ranking network 406 can specifically use a different training set to fine-tune each individual PP network, e.g., by applying a first training set to fine-tune the first PP network 930, a second training set to fine-tune the second PP network 932, and so on.

Other implementations of the pair-ranking network 406 can use other types of machine-learned classifications models compared to the architecture shown in FIG. 9. For example, other implementations of the pair-ranking network 406 can use a logistic regression classifier model, a CNN, a decision tree network, etc.

Figure 10:
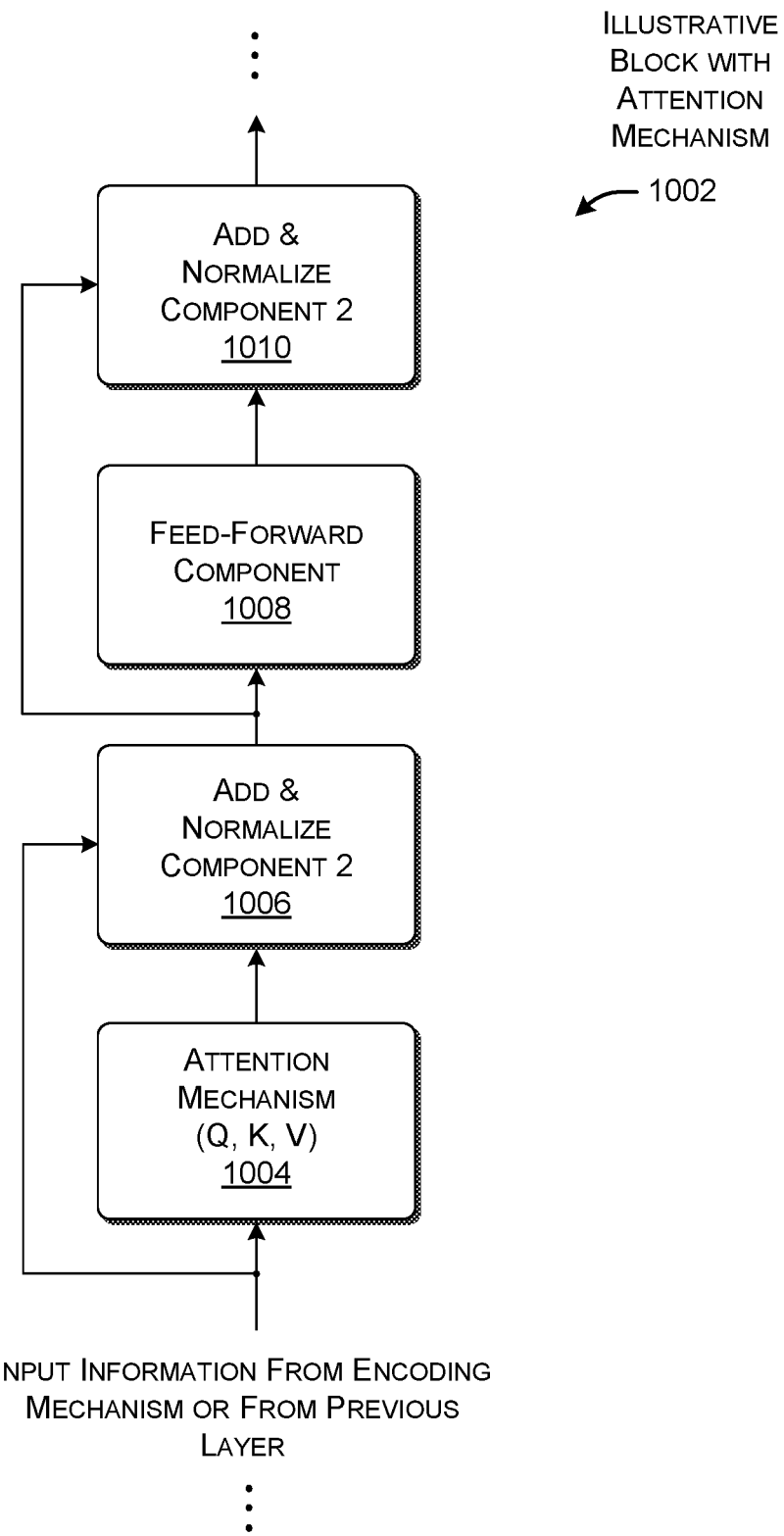
FIG. 10 shows one implementation of a processing block. One or more stages of the question-generating system of FIG. 4 can be constructed using this kind of processing block.

FIG. 10 shows one implementation of a processing block 1002 that is implemented as a multi-layer transformer-based neural network that includes an attention mechanism 1004. In some implementations, the processing block 1002 is used to implement at least parts of any decoder block or encoder block described above. For example, the processing block 1002 of FIG. 10 can be used to implement the representative encoder block 916 of FIG. 9. An encoder network or a decoder network may include a pipeline of the kind of processing blocks shown in FIG. 10, with the output of one processing block serving as input information to a subsequent processing block.

In some non-limiting implementations, the processing block 1002 includes the attention mechanism 1004, an add-&-normalize component 1006, a feed-forward component 1008, and another add-&-normalize component 1010. The attention mechanism performs attention (e.g., self-attention, cross-attention, etc.) in any manner, such as by using the transformations described in Equation (1) or Equation (2). The first add-&-normalize component 1006 adds the input information fed to the attention mechanism 1004 to the output information provided by the attention mechanism 1004 (thus forming a residual connection), and then performs layer-normalization on that result. Layer normalization entails adjusting values in a layer based on the mean and deviation of those values in the layer. The feed-forward component 1008 uses one or more fully connected neural network layers to map input information to output information. The second add-&-normalize component 1010 performs the same function as the first add-&-normalize component 1006.

In conclusion to Section A, the passage-selecting network 402 serves to identify a subset of passages to be subsequently mined for answers. The subset may include fewer passages than a total number of passages in the document 408. The filtering role performed by the passage-selecting network 402 operates to reduce the amount of work that the question-generating network 404 and the pair-ranking network 406 need to perform, e.g., by reducing the number of candidate passages to process. This provision, in turn, may allow the question-generating system 104 to consume less system resources than would otherwise be required. The system resources include processing resources, memory resources, etc. This provision enables the question-generating system 104 to effectively run on even resource-constrained computing platforming, such as those provided by some handheld devices.

In addition, or alternatively, this provision may allow the question-generating system 104 to produce its output results in less time than would otherwise be required. In some implementations, for instance, this provision allows the question-generating system 104 to perform its output results in real time.

In some implementations, an engineer can also leverage the efficiency gained by the question-generating system's overall architecture by increasing the robustness of the question-generating network 404. The engineer can accomplish this goal by increasing the number of decoding blocks in the question-generating network 404. In other words, the engineer can apply system resources that are freed up by question-generating system's overall architecture to enhance selected parts of the question-generating system 104. The inventors have specifically found that enhancing the number of layers in the question-generating network 404 produces a significant increase in the quality of the output questions produced by the question-generating system 104, e.g., compared to increasing the size of the models used by the first and third stages of the question-generating system 104.

According to another technical characteristic, the question-generating system 104 produces good quality results by dynamically generating its answers, rather than, for instance, relying on a static repository of pre-generated answers. However, in other implementations, the question-generating system 104 can cache frequently-generated questions to improve its performance.

Further, the question-generating system 104 can be successfully applied to many different subject matter domains, without using models that have been specifically designed to handle those subject matter domains. The question-generating system 104 achieves this goal by breaking its question-generating task into parts, and using large quantities of general-purpose training data to train each part. The question-generating system 104 can further improve its generality by training its models using pre-trained base models (e.g., where the base models are trained to perform one or more language-modeling tasks). The generality of the question-generating system 104 makes it a scalable and flexible solution that can be applied to many different applications systems with minimal or no modification. This characteristic of the question-generating system 104 also expedites its training-stage development.

The above-identified technical characteristics are mentioned in the spirit of illustration, not limitation. Other implementations can expose and leverage other technical benefits.

B. Illustrative Processes

Figure 11:
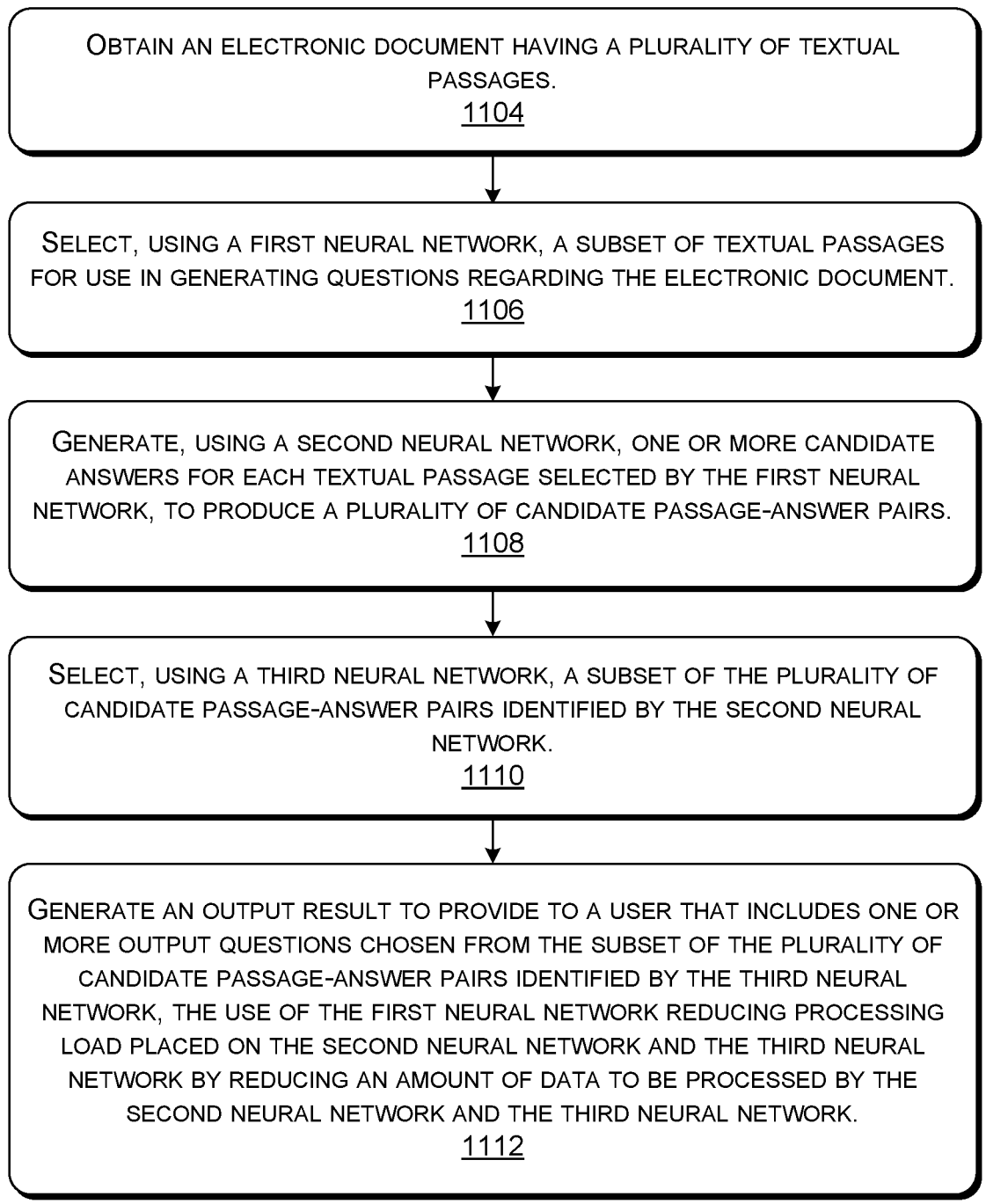
FIG. 11 is a flowchart that shows one illustrative manner of operation of the question-generating system of FIG. 4.

FIGS. 11 and 12 show processes that explain the operation of the systems of Section A in flowchart form. Since the principles underlying the operation of the systems have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In some implementations, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

More specifically, FIG. 11 depicts a process 1102 that represents one illustrative manner of operation of the question-generating system 104 of FIG. 4. In block 1104, the question-generating system 104 obtains the electronic document 408 having a plurality of textual passages, e.g., in response to a user selecting and opening that electronic document 408. In block 1106, the question-generating system 104 selects, using the first neural network 402, a subset of textual passages for use in generating questions regarding the electronic document 408. In one non-limiting case, the subset of textual passages selected by the first neural network 402 is less than a total number of textual passages in the electronic document 408. In block 1108, the question-generating system 104 generates, using the second neural network 404, one or more candidate answers for each textual passage selected by the first neural network 402, to produce a plurality of candidate passage-answer pairs. In block 1110, the question-generating system 104 selects, using the third neural network 406, a subset of the plurality of candidate passage-answer pairs identified by the second neural network 404. In block 1112, the question-generating system 104 generates an output result to provide to a user that includes one or more output questions chosen from the subset of the plurality of candidate passage-answer pairs identified by the third neural network 406. The use of the first neural network 402 reduces processing load placed on the second neural network 404 and the third neural network 406 by reducing an amount of data to be processed by the second neural network 404 and the third neural network 406.

FIG. 12 is a process 1202 that describes one application of the question-generating system 104 of FIG. 1. The agent that performs the operations will be generally referred to as a "hosting system." In block 1204, the hosting system receives an instruction from a user to activate the search system 208, the search system 208 being configured to execute a search within the electronic document 408. In block 1206, the hosting system generates the control element 304 in response to the instruction that enables the user to interact with the search system 208 via a user interface. In block 1208, the hosting system invokes the question-generating system 104, which produces one or more output questions, the output questions being formulated for presentation by the control element 304.

C. Representative Computing Functionality

FIG. 13 shows an example of computing equipment that can be used to implement any of the systems summarized above. The computing equipment includes a set of user computing devices 1302 coupled to a set of servers 1304 via a computer network 1306. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1306 can be implemented as a local area network, a wide area network (e.g., the Internet), one or more point-to-point links, or any combination thereof.

FIG. 13 also indicates that any hosting system 1308 that uses the question-generating system 104 can be spread across the user computing devices 1302 and/or the servers 1304 in any manner. Although not shown, the question-generating system 104 itself can be spread across the user computing devices 1302 and/or the servers 1304 in any manner. For instance, in some cases, the hosting system 1308 and the question-generating system 104 are entirely implemented by one or more of the servers 1304. Each user may interact with the servers 1304 via a browser application or other programmatic interface provided by a user computing device. In other cases, the services of the hosting system 1308 and the question-generating system 104 are entirely implemented by a user computing device in local fashion, in which case no interaction with the servers 1304 is necessary. In other cases, the functionality associated with the hosting system 1308 and the question-generating system 104 is distributed between the servers 1304 and each user computing device in any manner. Similarly, the functionality of the training system 420 can be spread among the servers 1304 and any user computing device in any manner.

Figure 14:
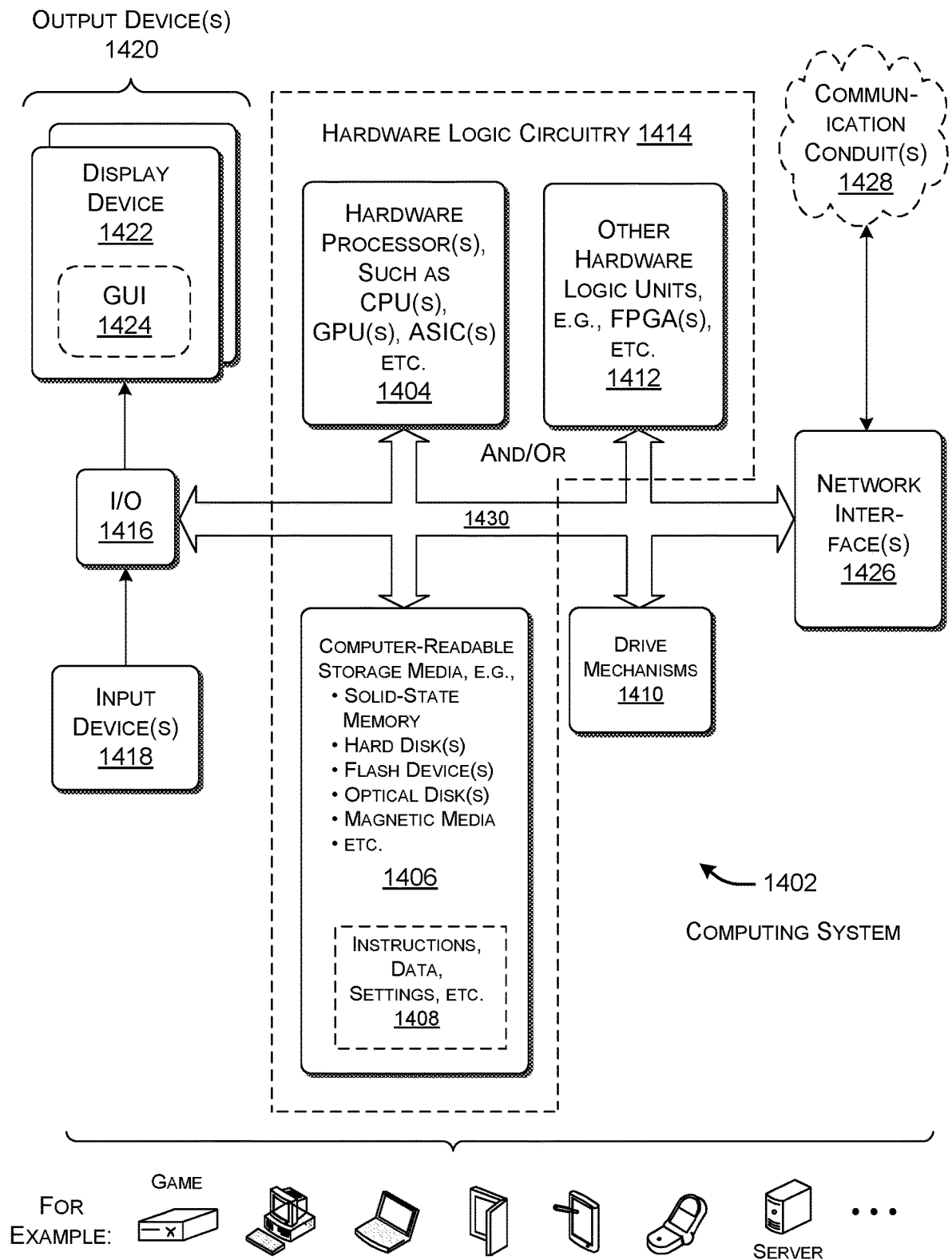
FIG. 14 shows an illustrative type of computing system that can be used to implement any aspect of the features shown in the foregoing drawings.

FIG. 14 shows a computing system 1402 that can be used to implement any aspect of the mechanisms set forth in the above-described figures. For instance, the type of computing system 1402 shown in FIG. 14 can be used to implement any server or any user computing device shown in FIG. 13. In all cases, the computing system 1402 represents a physical and tangible processing mechanism.

The computing system 1402 can include one or more hardware processors 1404. The hardware processor(s) 1404 can include, without limitation, one or more Central Processing Units (CPUs), and/or one or more Graphics Processing Units (GPUs), and/or one or more Neural Processing Units (NPUs), and/or one or more Application Specific Integrated Circuits (ASICs), etc. More generally, any hardware processor can correspond to a general-purpose processing unit or an application-specific processor unit.

The computing system 1402 can also include computer-readable storage media 1406, corresponding to one or more computer-readable media hardware units. The computer-readable storage media 1406 retains any kind of information 1408, such as machine-readable instructions, settings, data, etc. Without limitation, the computer-readable storage media 1406 may include one or more solid-state devices, one or more magnetic hard disks, one or more optical disks, magnetic tape, and so on. Any instance of the computer-readable storage media 1406 can use any technology for storing and retrieving information. Further, any instance of the computer-readable storage media 1406 may represent a fixed or removable unit of the computing system 1402. Further, any instance of the computer-readable storage media 1406 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1402 can utilize any instance of the computer-readable storage media 1406 in different ways. For example, any instance of the computer-readable storage media 1406 may represent a hardware memory unit (such as Random Access Memory (RAM)) for storing transient information during execution of a program by the computing system 1402, and/or a hardware storage unit (such as a hard disk) for retaining/archiving information on a more permanent basis. In the latter case, the computing system 1402 also includes one or more drive mechanisms 1410 (such as a hard drive mechanism) for storing and retrieving information from an instance of the computer-readable storage media 1406.

The computing system 1402 may perform any of the functions described above when the hardware processor(s) 1404 carry out computer-readable instructions stored in any instance of the computer-readable storage media 1406. For instance, the computing system 1402 may carry out computer-readable instructions to perform each block of the processes described in Section B.

Alternatively, or in addition, the computing system 1402 may rely on one or more other hardware logic units 1412 to perform operations using a task-specific collection of logic gates. For instance, the hardware logic unit(s) 1412 may include a fixed configuration of hardware logic gates, e.g., that are created and set at the time of manufacture, and thereafter unalterable. Alternatively, or in addition, the other hardware logic unit(s) 1412 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 14 generally indicates that hardware logic circuitry 1414 includes any combination of the hardware processor(s) 1404, the computer-readable storage media 1406, and/or the other hardware logic unit(s) 1412. That is, the computing system 1402 can employ any combination of the hardware processor(s) 1404 that execute machine-readable instructions provided in the computer-readable storage media 1406, and/or one or more other hardware logic unit(s) 1412 that perform operations using a fixed and/or programmable collection of hardware logic gates. More generally stated, the hardware logic circuitry 1414 corresponds to one or more hardware logic units of any type(s) that perform operations based on logic stored in and/or otherwise embodied in the hardware logic unit(s). Further, in some contexts, each of the terms "component," "module," "mechanism," "engine," "system," and "tool" refers to a part of the hardware logic circuitry 1414 that performs a particular function or combination of functions.

In some cases (e.g., in the case in which the computing system 1402 represents a user computing device), the computing system 1402 also includes an input/output interface 1416 for receiving various inputs (via input devices 1418), and for providing various outputs (via output devices 1420). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1422 and an associated graphical user interface presentation (GUI) 1424. The display device 1422 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1402 can also include one or more network interfaces 1426 for exchanging data with other devices via one or more communication conduits 1428. One or more communication buses 1430 communicatively couple the above-described units together.

The communication conduit(s) 1428 can be implemented in any manner, e.g., by a local area computer network, a wide area computer network (e.g., the Internet), point-to-point connections, etc., or any combination thereof. The communication conduit(s) 1428 can include any combination of hardwired links, wireless links, routers, gateway functionality, name servers, etc., governed by any protocol or combination of protocols.

FIG. 14 shows the computing system 1402 as being composed of a discrete collection of separate units. In some cases, the collection of units corresponds to discrete hardware units provided in a computing device chassis having any form factor. FIG. 14 shows illustrative form factors in its bottom portion. In other cases, the computing system 1402 can include a hardware logic unit that integrates the functions of two or more of the units shown in FIG. 1. For instance, the computing system 1402 can include a system on a chip (SoC or SOC), corresponding to an integrated circuit that combines the functions of two or more of the units shown in FIG. 14.

The following summary provides a non-exhaustive set of illustrative examples of the technology set forth herein.

(A1) According to a first aspect, some implementations of the technology described herein include a method (e.g., the process 1102 of FIG. 11) that includes operations of: obtaining (e.g., in block 1104) an electronic document (e.g., document 408) having a plurality of textual passages; selecting (e.g., in block 1106), using a first neural network (e.g., the passage-selecting network 402), a subset of textual passages for use in generating questions regarding the electronic document; generating (e.g., in block 1108), using a second neural network (e.g., the question-generating network 404), one or more candidate answers for each textual passage selected by the first neural network, to produce a plurality of candidate passage-answer pairs; selecting (e.g., in block 1110), using a third neural network (e.g., the pair-ranking network 406), a subset of the plurality of candidate passage-answer pairs identified by the second neural network; and generating (e.g., in block 1112) an output result to provide to a user that includes one or more output questions chosen from the subset of the plurality of candidate passage-answer pairs identified by the third neural network. According to one technical advantage, the use of the first neural network reduces processing load placed on the second neural network and the third neural network by reducing an amount of data to be processed by the second neural network and the third neural network.

In one non-limiting case, the subset of textual passages selected by the first neural network is less than a total number of textual passages in the electronic document.

(A2) According some implementations of the method of A1, the method further includes randomly selecting a query embedding produced in a distribution of query embeddings that has been produced in a prior training process. The first neural network is configured to generate attention information based on a consideration of a relation between the query embedding and each passage in the electronic document.

(A3) According some implementations of the method of A2, the training process computes each query embedding by: encoding an original query, to produce an encoded version of the original query; down-sampling the encoded version of the original query into a down-sampled version of the original query; and up-sampling the down-sampled version of the original query to an up-sampled version of the original query, the up-sampled version of the original query corresponding to a particular query embedding. The down-sampling operation has an effect of broadening a semantic scope of the original query.

(A4) According some implementations of the method of A3, the down-sampled version of the original query includes a single float value.

(A5) According some implementations of the method of any of A1-A4, the second neural network is a multi-layer transformer-based neural network having a plurality of decoding layers.

(A6) According some implementations of the method of any of A1-A5, the second neural network iteratively generates tokens associated with a particular candidate answer. A particular candidate token produced by the second neural network in a particular iteration is added to input information that is fed to the second neural network in a subsequent iteration, following the particular iteration.

(A7) According some implementations of the method of A6, the particular iteration produces plural candidate tokens for processing in the subsequent iteration, the plural candidate tokens including the particular candidate token.

(A8) According some implementations of the method of any of A1-A7, the third neural network is a multi-layer transformer-based neural network having a plurality of encoding layers.

(A9) According some implementations of the method of any of A1-A8, the third neural network maps a particular candidate passage-question pair to hidden state information, wherein the third neural network maps at least part of the hidden state information into a ranking score for the particular candidate passage-question pair.

(A10) According some implementations of the method of any of A1-A9, the method is commenced (e.g., in block 1204 of FIG. 14) in response to the user instructing an application system to activate a search system, the search system being configured to execute a search within the electronic document. Further, the method includes (e.g., in block 1206) generating a control element (e.g., the control element 304) that enables the user to interact with the search system via a user interface. The operation of generating the output result includes formulating the one or more output questions for presentation by the control element.

(A11) According some implementations of the method of A1-A10 the method further includes filtering the one or more output questions based on one or more query terms specified by the user.

(A12) According some implementations of the method of A1-A11, the method includes presenting at least one of the output questions to the user, and receiving a response from the user to the at least one question, the response serving to test an understanding of the electronic document by the user.

(B1) In yet another aspect, some implementations of the technology described herein include a computing system (e.g., the computing system 1402 of FIG. 14) for generating questions pertaining to an input document (e.g., the document 408) having a plurality of passages. The computing system includes a neural network that includes a first neural network (e.g., the passage-selecting network 402) trained using a first set of training examples (e.g., the first set 424), a second neural network (e.g., the question-generating network 404) trained using a second set of training examples (e.g., the second set 426), and a third neural network (e.g., the pair-ranking network 406) trained using a third set of training examples (e.g., the third set 428). The computing system is configured perform any of the methods described herein, e.g., any of methods A1-A12.

(C1) In yet another aspect, some implementations of the technology described herein include a computer-readable storage medium (e.g., the computer-readable storage medium 1406) for storing computer-readable instructions (e.g., the computer-readable instructions 1408). The computer-readable instructions, when executed by one or more hardware processors, perform any of the methods described herein, e.g., any of methods A1-A12.

More generally stated, any of the individual aspects, elements, and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1014 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating questions using a neural network, comprising:
   obtaining an electronic document having a plurality of textual passages;
   selecting, using a first neural network, a subset of textual passages for use in generating questions regarding the electronic document;
   generating, using a second neural network, one or more candidate answers for each textual passage selected by the first neural network, to produce a plurality of candidate passage-answer pairs;

selecting, using a third neural network, a subset of the plurality of candidate passage-answer pairs produced by the second neural network; and generating an output result to provide to a user that includes one or more output questions chosen from the subset of the plurality of candidate passage-answer pairs identified by the third neural network, the use of the first neural network reducing processing load placed on the second neural network and the third neural network by reducing an amount of data to be processed by the second neural network and the third neural network.

2. The method of claim 1, wherein the method further comprises randomly selecting a query embedding in a distribution of query embeddings that has been produced in a prior training process, and wherein the first neural network is configured to generate attention information based on a consideration of a relation between the query embedding and each passage in the electronic document.

3. The method of claim 2, wherein the training process computes each query embedding by:

encoding an original query, to produce an encoded version of the original query;

down-sampling the encoded version of the original query into a down-sampled version of the original query; and up-sampling the down-sampled version of the original query to an up-sampled version of the original query, the up-sampled version of the original query corresponding to a particular query embedding, wherein said down-sampling has an effect of broadening a semantic scope of the original query.

4. The method of claim 3, wherein the down-sampled version of the original query includes a single float value.

5. The method of claim 1, wherein the second neural network is a multi-layer transformer-based neural network having a plurality of decoding layers.

6. The method of claim 1, wherein the second neural network iteratively generates tokens associated with a particular candidate answer based on a particular candidate passage, wherein a particular candidate token that is produced by the second neural network in a particular iteration is added to input information that is fed to the second neural network in a subsequent iteration, following the particular iteration.

7. The method of claim 6, wherein the particular iteration produces plural candidate tokens for processing in the subsequent iteration, the plural candidate tokens including the particular candidate token.

8. The method of claim 1, wherein third neural network is a multi-layer transformer-based neural network having a plurality of encoding layers.

9. The method of claim 1, wherein the third neural network maps a particular candidate passage-question pair to hidden state information, wherein the third neural network maps at least part of the hidden state information into a ranking score for the particular candidate passage-question pair.

10. The method of claim 1, wherein the method is commenced in response to the user instructing an application system to activate a search system, the search system being configured to execute a search within the electronic document, wherein the method further includes generating a control element that enables the user to interact with the search system via a user interface, and wherein said generating the output result includes formulating the one or more output questions for presentation by the control element.

11. The method of claim 1, wherein the method further includes filtering the one or more output questions based on one or more query terms specified by the user.

12. The method of claim 1, wherein the method includes presenting at least one of the output questions to the user, and receiving a response from the user to said at least one question, the response serving to test an understanding of the electronic document by the user.

13. The method of claim 1, wherein the subset of textual passages selected by the first neural network is less than a total number of textual passages in the electronic document.

14. A computing system for generating questions pertaining to an input electronic document having a plurality of passages, comprising:

a neural network that includes a first neural network trained using a first set of training examples, a second neural network trained using a second set of training examples, and a third neural network trained using a third set of training examples, the first neural network being configured to select a subset of textual passages for use in generating questions regarding the electronic document, the second neural network being configured to generate one or more candidate answers for each textual passage selected by the first neural network, to produce a plurality of candidate passage-answer pairs, the third neural network being configured to select a subset of the plurality of candidate passage-answer pairs identified by the second neural network, the use of the first neural network reducing processing load placed on the second neural network and the third neural network by reducing an amount of data to be processed by the second neural network and the third neural network, the computing system further being configured to generate an output result for a user that includes one or more output questions chosen from the subset of the plurality of candidate answer pairs identified by the third neural network.

15. The computing system of claim 14, wherein the computing system is further configured to randomly select a query embedding in a distribution of query embeddings that has been produced in a prior training process, and wherein the first neural network is configured to generate attention information based on a consideration of a relation between the query embedding and each passage in the electronic document.

16. The computing system of claim 15, wherein the training process computes each query embedding by:

encoding an original query, to produce an encoded version of the original query;

down-sampling the encoded version of the original query into a down-sampled version of the original query; and up-sampling the down-sampled version of the original query to an up-sampled version of the original query, the up-sampled version of the original query corresponding to a particular query embedding, wherein said down-sampling has an effect of broadening a semantic scope of the original query.

17. The computing system of claim 14,
wherein the second neural network is configured to iteratively generate tokens associated with a particular candidate answer based on a particular candidate passage,
wherein, for each iteration in a generation of the particular candidate answer, the second neural network is configured to generate plural candidate tokens for processing in a subsequent iteration.

18. The computing system of claim 14,
wherein the third neural network is configured to map a particular candidate passage-question pair to hidden state information,
wherein the third neural network is configured to map at least part of the hidden state information into a ranking score for the particular candidate passage-question pair.

19. The computing system of claim 14, wherein the computing system is configured to invoke processing by the first neural network in response to the user activating a search system, the search system being configured to execute a search within the electronic document,
wherein the computing system is configured to generate a control element that enables the user to interact with the search system via a user interface, and
wherein the computing system is configured to generate the output result by formulating the one or more output questions for presentation by the control element.

20. A computer-readable storage medium for storing computer-readable instructions, the computer-readable instructions, when executed by one or more hardware processors, performing a method that comprises:
obtaining an electronic document having a plurality of textual passages;
receiving an instruction from a user to activate a search system, the search system being configured to execute a search within the electronic document;
in response to the instruction, selecting, using a first neural network, a subset of textual passages in the electronic document for use in generating questions pertaining to the electronic document;
generating, using a second neural network, one or more candidate answers for each textual passage selected by the first neural network, to produce a plurality of candidate passage-answer pairs;
selecting, using a third neural network, a subset of the plurality of candidate passage-answer pairs identified by the second neural network; and
generating an output result that includes one or more output questions chosen from the subset of the plurality of candidate passage-answer pairs identified by the third neural network,
the search system, the first neural network, the second neural network, and the third neural network being implemented by the computer-readable instructions.

* * * * *